United States Patent [19]
Grimm

[11] 3,787,065
[45] Jan. 22, 1974

[54] TRAILER FOR BICYCLES
[76] Inventor: Ronald F. Grimm, 5241 N. 25th St., Milwaukee, Wis. 53209
[22] Filed: Aug. 22, 1972
[21] Appl. No.: 282,755

[52] U.S. Cl. .............................................. 280/204
[51] Int. Cl. ............................................. B62k 27/00
[58] Field of Search .................................... 280/204

[56] References Cited
UNITED STATES PATENTS
| | | | |
|---|---|---|---|
| 1,105,731 | 8/1914 | Wells | 280/204 |
| 2,517,162 | 8/1950 | Arman | 280/204 X |
| 2,750,206 | 6/1956 | Sabato | 280/204 |
| 3,271,048 | 9/1966 | Beesley | 280/204 |

Primary Examiner—Richard A. Schacher
Attorney, Agent, or Firm—Gerald P. Welch

[57] ABSTRACT

A trailer for a bicycle including a plate affixed to the vertical support for the bicycle seat, a pair of trailing elements attached for limited lateral pivotal movement to said plate, means on the free ends of the trailing elements to dispose a pair of wheels in trailing alignment, and means to releaseably secure said trailing elements in spread trailing position, whereby upon release of said means the trailing elements may be folded into parallel contact for storage.

4 Claims, 5 Drawing Figures

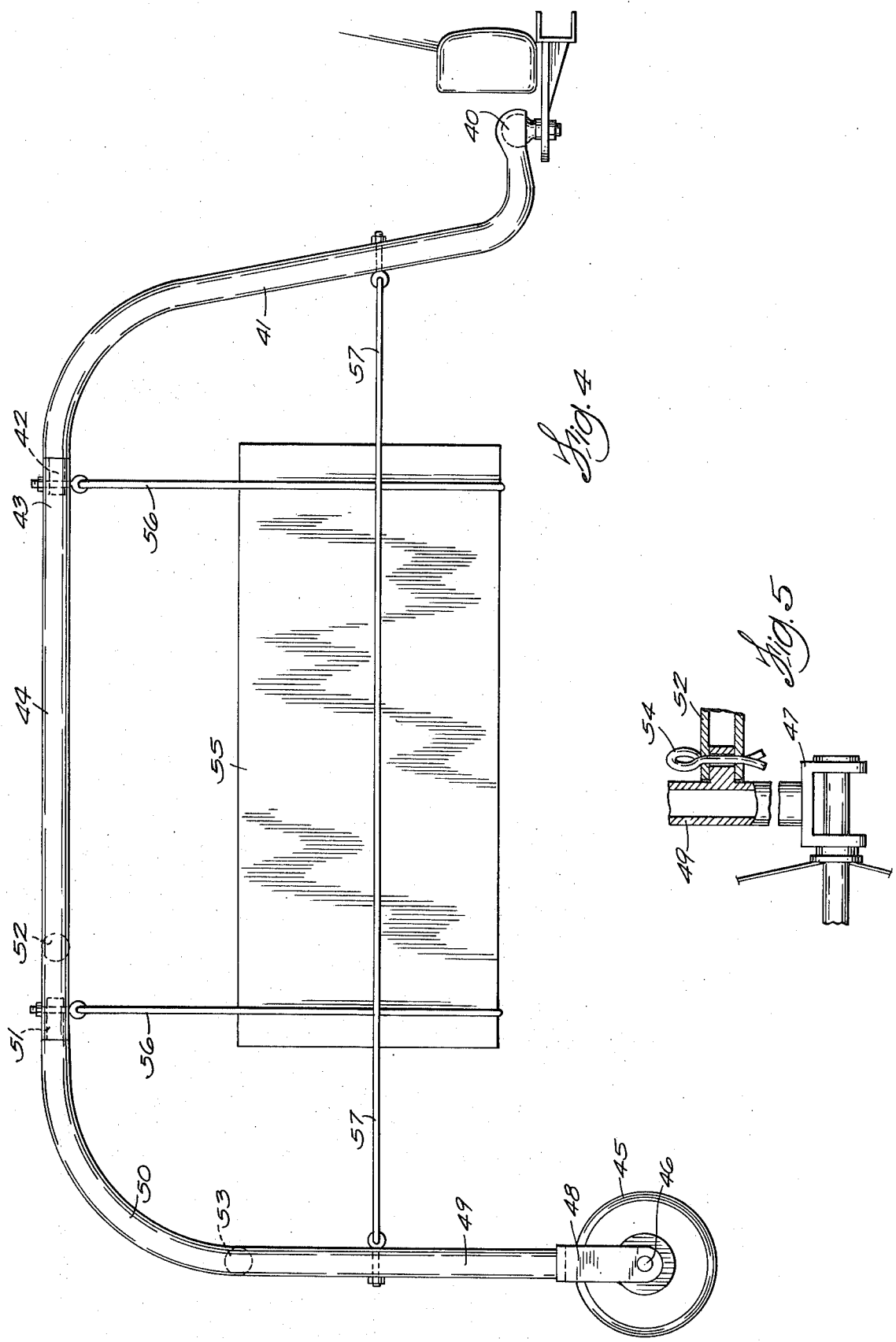

TRAILER FOR BICYCLES

BRIEF SUMMARY OF THE INVENTION

The bicycle trailer illustrated in FIGS. 1 to 3 is connected to a bicycle by means extending backwardly over the rear wheel of said bicycle and downwardly to a pair of ground-bearing wheels and is a great improvement over the usual handle bar basket in that it will accommodate larger and heavier loads without interfering with the stability and use of the bicycle. A pair of golf bags can easily be carried, and also relatively large containers of provisions as from a super market.

BRIEF DESCRIPTION OF THE DRAWINGS:

FIG. 4 is a side view in elevation of a modified form of the invention for attachment to motor vehicles.

FIG. 5 is a fragmentary view showing means for anchoring cross braces shown partly in elevation and partly in section.

DETAILED DESCRIPTION

Figure 1:
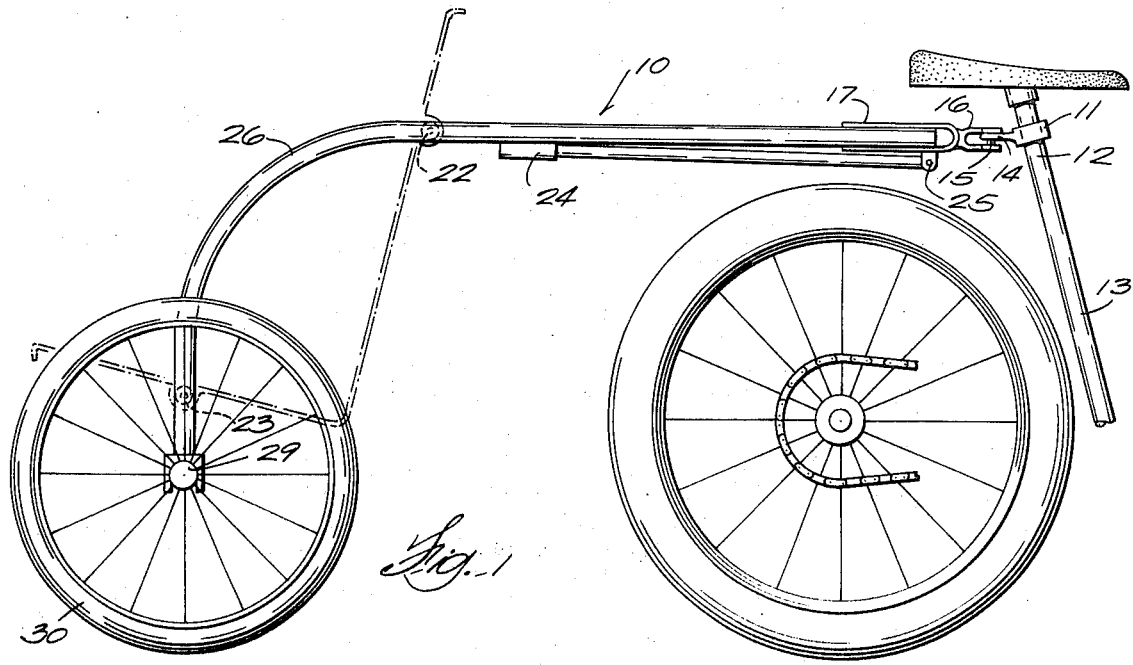
FIG. 1 is a side view in elevation of a trailer for bicycle pivotally connected with the seat post of the latter.
Figure 2:
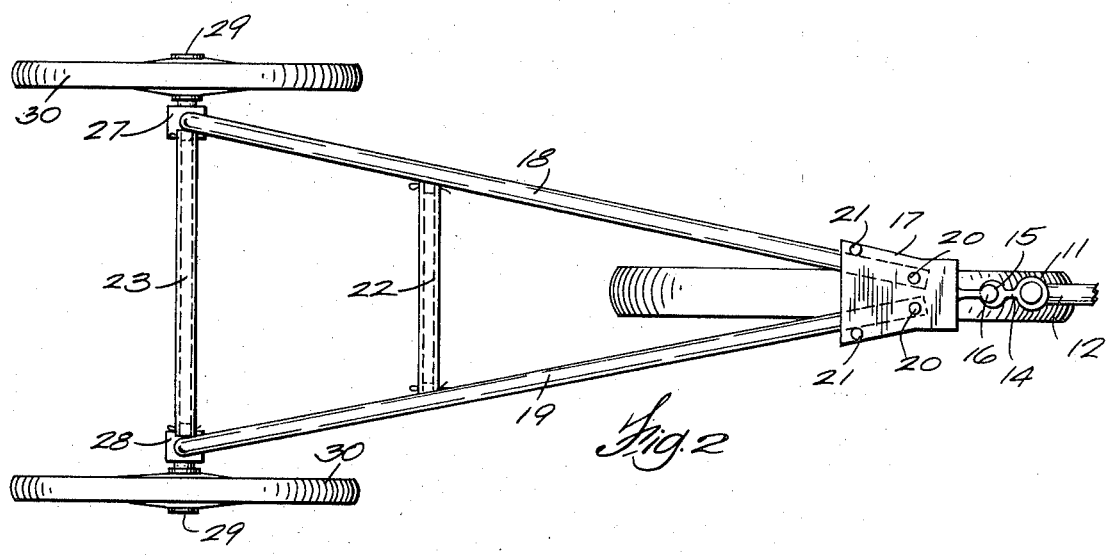
FIG. 2 is a plan view of the same.
Figure 3:
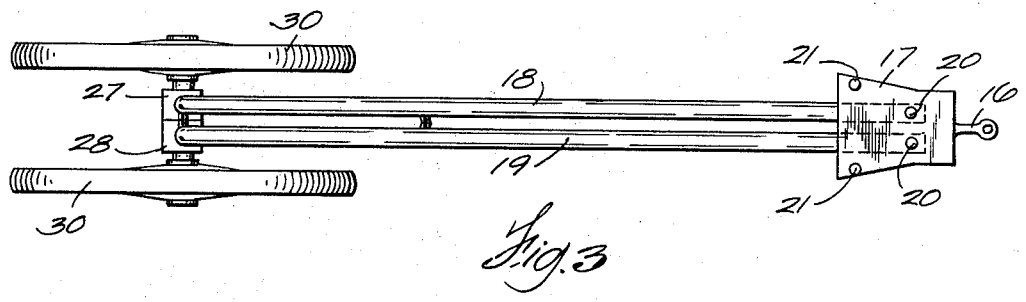
FIG. 3 is a plan view of the device folded for storage.

The device 10 is frontally supported by a collar 11 embracing the seat support member 12 on a bicycle frame 13, the said collar 11 having a rearwardly disposed eye 14 to accommodate a pin 15 engaged also through a clevis 16 integral with member 17 fixed as a double plate receiving a pair of tubular members 18 and 19 pivotal on bolts 20 and normally held against stop bolts 21 by the tubular spreaders 22 and 23. A handle member 24, pivoted at 25 may be swung forwardly for use of the device 10 as a golf cart. The rear portions 26 of the members 18 and 19 are bent arcuately downwardly and terminate in members 27 and 28 securing the axle 29, and the ground-bearing wheels 30.

A modified form of the invention has a ball and socket attachment at 40 integral with a pair of double curve elements 41 terminating in horizontal projections 42 which engage within the ends 43 of the tubular members 44.

Ground-bearing wheels 45 are mounted on the axle 46 secured to elements 47 forming bases for the sockets 48, which latter receive the tubular uprights 49 bent arcuately at 50 and terminating in the projections 51 which engage within the tubular elements 44 with a force fit or are secured by other appropriate means.

Spreaders 52 and 53 with pin means 54 maintain the frame elements in divergent position while a load, such as 55 supported by means 56 and hindered from excessive sway by means 57, is being transported.

Having thus described the invention, what is claimed, and desired to be secured by Letters Patent of the United States, is:

1. A trailer for bicycles including vertically spaced horizontal plates fixed to the bicycle seat support, and a pair of arcuate tubular trailing elements pivotally attached between said plates, means on the free ends of said trailing elements to accommodate a pair of wheels in parallel alignment, and means to releasably secure said trailing elements in rear end spread position.

2. A trailer for bicycles including a pair of vertically spaced horizontal plates fixed to a vertical bicycle seat support, a pair of longitudinally arcuate and tubular trailing elements attached to said plates for limited pivotal movement, means to brace the rear portions of the trailer elements in spread position, and means on the free ends of said trailer elements to accommodate a pair of ground-bearing wheels in proper trailing alignment.

3. A device as in claim 2, with the trailer elements formed in relatively short segments for storage, and means on the ends of said segments for releasably fixing each trailer element as a unitary structure.

4. A device as in claim 2 in which a double horizontal plate is pivotally connected with a collar secured to the support means for a bicycle seat.

* * * * *